UNITED STATES PATENT OFFICE.

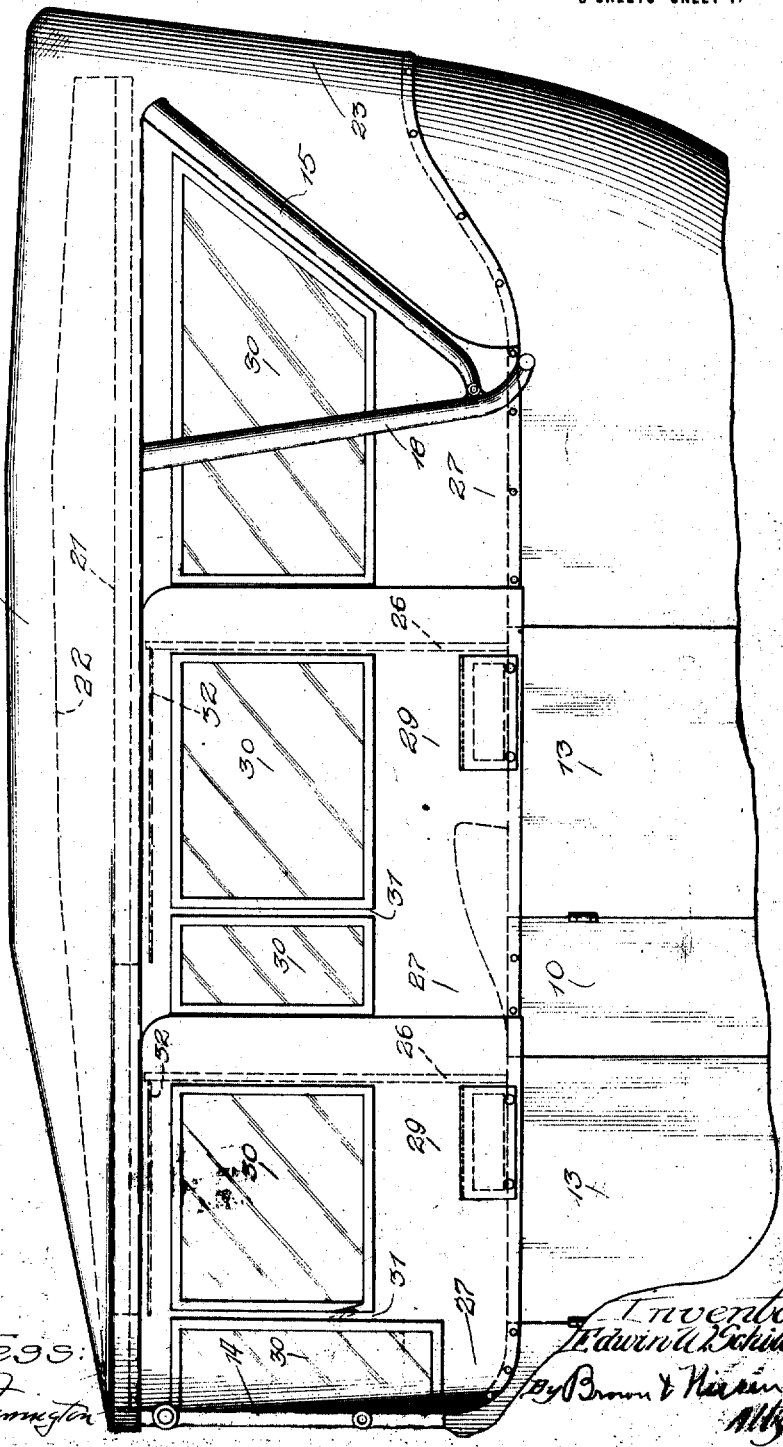

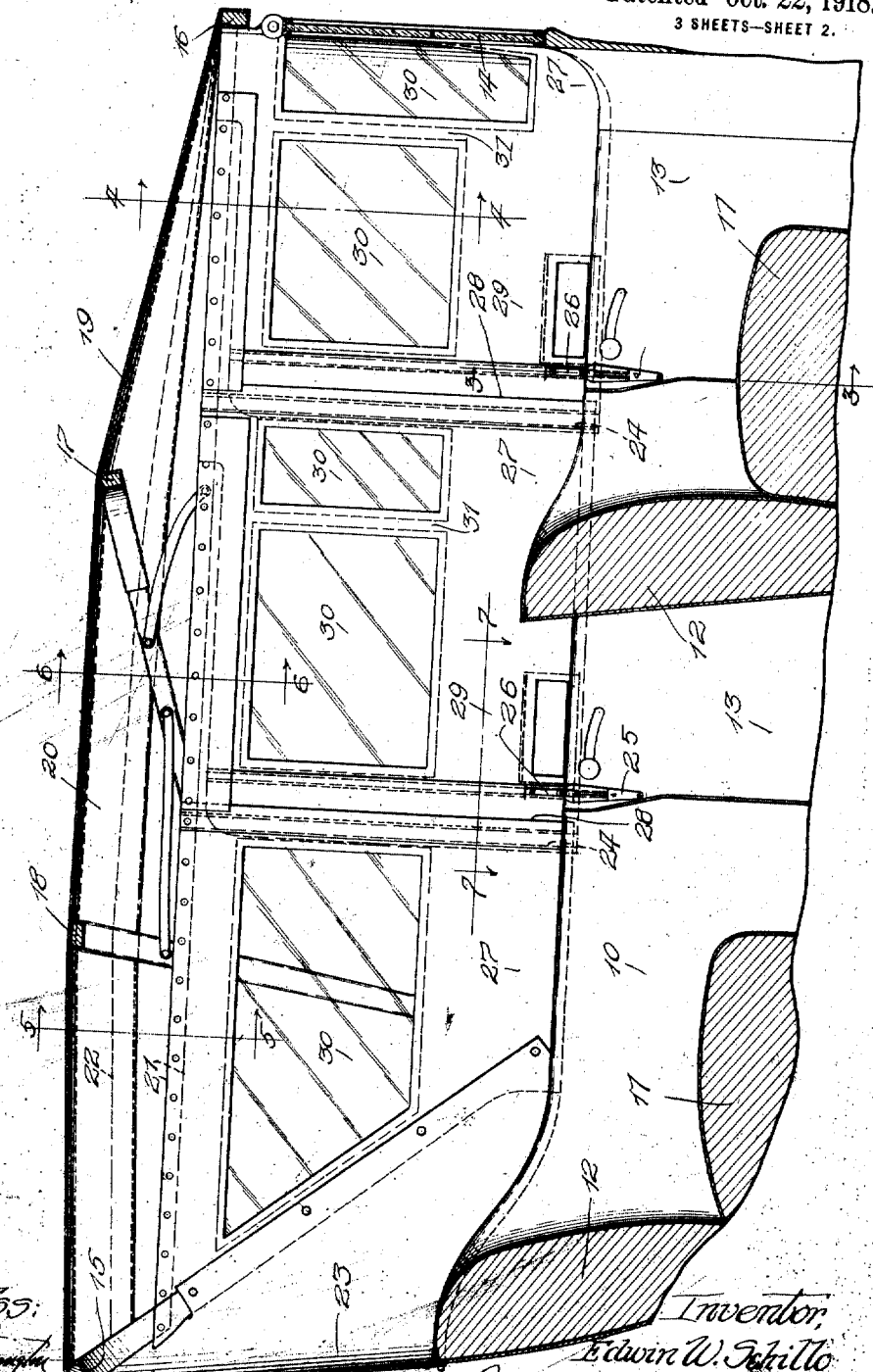

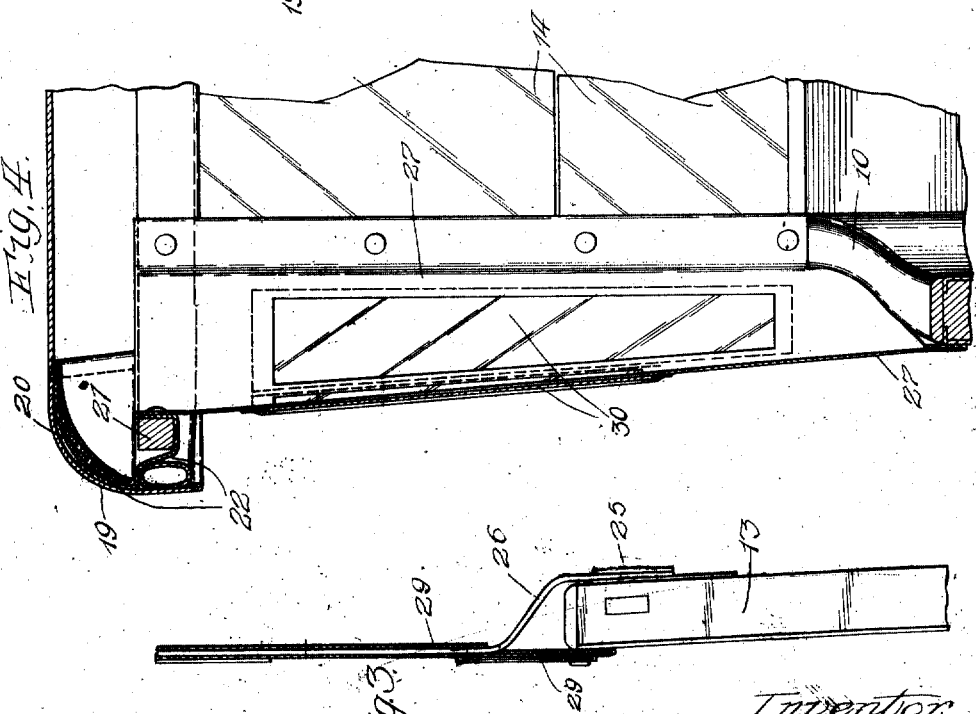

EDWIN W. SCHILLO, OF CHICAGO, ILLINOIS.

REINFORCED VEHICLE-CURTAIN.

1,282,469.  Specification of Letters Patent.  Patented Oct. 22, 1918.

Application filed October 11, 1917. Serial No. 195,919.

*To all whom it may concern:*

Be it known that I, EDWIN W. SCHILLO, a citizen of the United States, and a resident of Chicago, county of Cook, and State of Illinois, have invented certain Improvements in Reinforced Vehicle-Curtains, of which the following is a specification.

My invention relates to reinforced vehicle curtains and has for its object the provision of simple and efficient curtains for closing the space between the top and body of a vehicle for converting an open summer top into a closed winter top. Other objects will appear hereinafter.

An embodiment of my invention is shown in the accompanying drawings forming a part of this specification, and in which, Figure 1 is a side elevation of a vehicle top and portion of a vehicle body equipped with curtains embodying my invention.

Fig. 2 is a central longitudinal section of the same.

Figs. 3, 4, 5, 6 and 7 are sections taken on lines 3—3, 4—4, 5—5, 6—6 and 7—7 respectively of Fig. 2. In Figs. 5 and 6 the top bows are not shown.

Referring more particularly to the drawings, I have indicated the top portion of a vehicle body of conventional construction. In such a body are sides 10, seats 11, seat backs 12 and doors 13. It is understood that these parts may be of any desired construction. The front of the body is provided with a windshield 14 of conventional or any preferred design.

Mounted on the body I have shown a top such as is known in the arts as a "one-man top". Any other form of foldable top is capable of having my invention attached thereto. In the form shown there is a bow 15 at the rear and a bow 16 at the front with intermediate bows 17 and 18 between the front and rear bows. On the bows is mounted a top covering 19 of any desired material. In the corners of the bows extending longitudinally of the top are reinforcing members 20 which may be of conventional construction and are usually made up of padding material covered with a suitable cloth to give proper finish to the interior of the top.

My invention comprises securing side bars 21 along under the top with their ends secured to the front bows 16 and the rear bows 15, in any desired manner. On the adjacent sides of the two side bars 21, only one of which is shown in the drawings, I secure the longitudinal edges of strips of material such as pantasote, passing this material under the side bars 21 so as to inclose the latter on the inside of the top, and then secure the other edges of the flexible strips 22 between the reinforcing material 20 and the top cover 19, so that the spaces between the side bars 21 and the longitudinal edges of the top cover 19 are entirely closed. This provides a weathertight joint or one which will prevent moisture or wind from passing into the top between the side bars 21 and the edges of the top cover.

The space between the back of the body and the back end of the top covering is closed by a covering material 23, which in most vehicles is a continuation of the top covering 19. This covering usually extends around from the back of the vehicle top to the rear bows 15. When the material 23 does not extend around to the bows 15, then the side curtains of my invention extend around to connect with the rear curtain of the top so as to completely inclose the space between the back of the top and the back of the vehicle.

I provide upright bars 24 with their top ends secured to the side bars 21 and their bottom ends secured to the top portions of the sides 10 of the body. The bars 24 give rigidity to the construction and support the intermediate portions of the bars 21. Near the outer edges of the doors 13 I provide sockets 25 which are preferably tapered downwardly. In these sockets 25 I provide upright bars 26 which extend upwardly substantially parallel with and close to the upright bars 24. The bars 26 extend upwardly close to the under sides of the bars 21. Between the side bars 21 and the tops of the sides 10 of the car body I provide side curtains made up of portions 27 secured to the side bars and body sides 10 and upright bars 24 in such a manner as to close the space between the side bars and the top of the vehicle body 10. The side curtains 27 are provided with slits or openings 28 which are in substantial alinement with the outer edges of the doors 13. The portions 29 of the curtains 27, above the doors 13, are secured to the upright pieces 26 so that when the doors 13 swing on their hinges, the portions 29 immediately above the doors swing also. Along the openings 28, the side curtains are formed so that they overlap each other, substantially as indicated in Fig. 7, so that there are weathertight joints between the edges of the openings in the curtains above the doors 13 and side 10 of the car body. With this construction the reinforced curtains described, provide means for inclosing the space between the top and body of the car. This construction is not intended to be removed often but is intended to be fitted in place in the fall and then removed in the spring so that a vehicle equipped therewith can be used as a closed car during the cold weather and an ordinary folding top open car in the warmer parts of the year.

The curtain parts 27 and 29 may be provide with openings covered with transparent material 30. This transparent material may be of celluloid or any other desired substance and secured into the curtains in a conventional manner, such as indicated in the drawings. The transparent sheets 30 are preferably formed in such sizes that upon opening the doors 13, such transparent sheets will not be bent. This is accomplished by providing narrow portions 31 of the curtain material between the transparent sheets 30. Also at the tops of the portions 29 of the curtain material above the doors 13, I preferably provide bars 32, see Fig. 6, to stiffen the tops of the material 29 so that weathertight joints will be provided at the tops of such portions 29 so that the door openings in the curtains will be sufficiently tight to prevent wind, rain and snow from entering the interior of the top. By positioning the side bars 21 and top edges of the side curtains a considerable distance inside of the lateral edges of the top, as clearly indicated in Figs. 4, 5 and 6, the portions of the top extending beyond the bars 21 provide a sort of canopy or shield facilitating keeping water, and the like, out of the door openings, especially the tops of the latter.

While I have illustrated and described the preferred form of my invention, I do not wish to be limited to the precise details of construction set forth, but desire to avail myself of such variations and modifications as come within the scope of the appended claims.

I claim:

1. The combination with a vehicle body and a vehicle top comprising a plurality of bows and a top covering on said bows, of two side bars having their ends secured to the end bows of the top and their intermediate portions extending between the intermediate bows of the top and spaced from the lateral edges of the top covering; strips of flexible material secured to the adjacent sides of the side bars, passing under the latter and secured on the inner side of the top covering; and flexible pieces closing the spaces between the side bars and said body.

2. The combination with a vehicle body and a vehicle top comprising a plurality of bows and a top covering on said bows, of reinforcing strips adjacent the lateral edges and on the under side of the top covering; two side bars having their ends secured to the front and rear end portions of the top and disposed inside the bows of the latter; flexible strips secured to the adjacent sides of said side bars, extending under said side bars and secured between the top covering and said reinforcing strips; and flexible pieces secured at their top edges to the adjacent sides of said side bars and secured to the vehicle body at their lower edges.

3. The combination with a vehicle body and a vehicle top comprising a plurality of bows and a top covering on said bows, of two side bars having their ends secured to the end bows of the top and their intermediate portions extending between the intermediate bows of the top and spaced from the lateral edges of the top covering; strips of flexible material secured to the adjacent sides of the side bars, passing under the latter and secured on the inner side of the top covering; upright bars secured to the top edges of the vehicle body and intermediate parts of said side bars; and flexible strips secured at their top edges to said side bars and at their lower edges to the top of said vehicle body.

4. The combination with a vehicle body having side doors therein and a vehicle top having a plurality of bows and a top covering on said bows, of side bars having their ends secured to the end bows of the top with intermediate portions extending between the intermediate bows of the top and spaced inside of said bows, a substantial distance from the lateral edges of the top covering; strips of flexible material secured to the adjacent sides of the side bars passing under the latter and secured to the top covering; flexible pieces closing the spaces between the side bars and said body having door openings immediately above the doors of said body; a bar extending upwardly from each of said doors; door curtains attached to said flexible pieces at said door openings and securing to said upright bars and the tops of said doors, one vertical edge and the top edge of each door curtain overlapping adjacent portions of said flexible pieces; and stiffening members in the tops of the door curtains, the portions of said vehicle top extending beyond said side bars being adapted to provide a protecting means for the tops of the door curtains.

In testimony whereof I have signed my name to this specification, on this 2d day of October, A. D. 1917.

EDWIN W. SCHILLO.